United States Patent
Asawa

(10) Patent No.: US 10,938,216 B2
(45) Date of Patent: Mar. 2, 2021

(54) METHODS AND SYSTEMS FOR SYNCHRONIZING ENERGY MANAGEMENT BETWEEN NEIGHBORING MICROGRIDS

(71) Applicant: WIPRO LIMITED, Bangalore (IN)

(72) Inventor: Manjari Asawa, Cupertino, CA (US)

(73) Assignee: Wipro Limited, Bangalore (IN)

(*) Notice: Subject to any disclaimer, the term of this patent is extended or adjusted under 35 U.S.C. 154(b) by 174 days.

(21) Appl. No.: 16/124,747

(22) Filed: Sep. 7, 2018

(65) Prior Publication Data
US 2020/0083714 A1 Mar. 12, 2020

(51) Int. Cl.
| | | |
|---|---|---|
| G05B 13/02 | (2006.01) | |
| H02J 3/38 | (2006.01) | |
| G05B 13/04 | (2006.01) | |
| H02J 7/00 | (2006.01) | |
| H02J 3/32 | (2006.01) | |
| H02J 3/00 | (2006.01) | |

(52) U.S. Cl.
CPC .......... *H02J 3/382* (2013.01); *G05B 13/0265* (2013.01); *G05B 13/048* (2013.01); *H02J 3/32* (2013.01); *H02J 7/0013* (2013.01); *H02J 3/003* (2020.01)

(58) Field of Classification Search
None
See application file for complete search history.

(56) References Cited

U.S. PATENT DOCUMENTS

| | | | | |
|---|---|---|---|---|
| 9,307,027 | B2* | 4/2016 | Shimizu | .............. H04L 67/2823 |
| 2008/0167931 | A1* | 7/2008 | Gerstemeier | .... G06Q 10/06315 |
| | | | | 705/7.22 |
| 2011/0010016 | A1* | 1/2011 | Giroti | .................... G06Q 50/06 |
| | | | | 700/291 |
| 2013/0046668 | A1* | 2/2013 | Al Faruque | ............ G06Q 40/00 |
| | | | | 705/35 |
| 2014/0163756 | A1* | 6/2014 | Idrees | ..................... H02J 3/381 |
| | | | | 700/291 |
| 2016/0118799 | A1 | 4/2016 | Makell et al. | |

(Continued)

FOREIGN PATENT DOCUMENTS

| | | |
|---|---|---|
| WO | 2012120161 A1 | 9/2012 |
| WO | 2015021603 A1 | 2/2015 |

*Primary Examiner* — Bernard G Lindsay
(74) *Attorney, Agent, or Firm* — Finnegan, Henderson, Farabow, Garrett & Dunner, LLP

(57) ABSTRACT

A method and system for operating neighbouring microgrids is disclosed. The method includes creating a first set of energy management policies associated with a predefined area and a second set of energy management policies associated with a microgrid. The method includes measuring power usage data associated with predefined area and current charge level of batteries within the predefined area. The method further includes determining future power demand of the predefined area, based on predefined analytics performed on the measured power usage data and the current charge level of the batteries. The method includes adapting the data models of predefined area with the data models used in microgrid and utility operations for seamless integration of operations and to optimize overall operations while complying with local, edge and overall policies. The method includes applying the first set of energy management policies within the predefined area based on the determined future power demand.

16 Claims, 7 Drawing Sheets

(56) References Cited

U.S. PATENT DOCUMENTS

2017/0229870 A1*  8/2017  Singh .................... H02J 3/386
2018/0226800 A1*  8/2018  Bhattarai ............... G05B 15/02
2018/0232818 A1*  8/2018  Eda ....................... H02J 3/381

* cited by examiner

METHODS AND SYSTEMS FOR SYNCHRONIZING ENERGY MANAGEMENT BETWEEN NEIGHBORING MICROGRIDS

TECHNICAL FIELD

This disclosure relates generally to microgrids and more particularly to methods and systems for operating neighbouring microgrids.

BACKGROUND

Conventional power grids have been under much pressure due to increasing demand, and variation in demand patterns that have made peak power much higher than average thereby requiring thicker wires even with same average load. This is further aggravated by aging infrastructures, aging power lines and natural disasters. Clearly, providing energy reliability and resiliency in presence of increasing demand, natural disasters and cyber-threats is becoming challenging.

In this environment, neighborhood microgrid that can be islanded in case of disasters and connected back to the grid when needed may be a powerful tool for utilities to be able to continue to provide services to their customers. In a world deeply dependent on electricity, neighborhood microgrids can serve the greater good by ensuring power will continue to flow even where the central grid fails. However, the costs of microgrids have been high due to individualized custom design required for specific business needs for each of them.

However, due to synchronization requirements within a microgrid based only on renewable energy systems, which are often DC sources, it is difficult to keep the neighborhood system synchronized in the absences of connectivity with the main grid. Further, there is no standard method defined as to how to connect such microgrids to increasing popular home energy management system to achieve overall optimal energy efficiency. In absence of clear architecture that can support multiple renewable generation sources, microgrids are often built as customized, one-off projects.

Clearly, it is difficult to scale under this model, and microgrid continue to stay expensive for a general neighborhood. Further, due to absence of the end-to-end integration, flexibility of operational models and integration with other energy systems, utilities don't have a clear business case or technology directions to support and encourage construction of microgrid.

SUMMARY

In one embodiment, a method for operating neighboring microgrids is disclosed. The method includes creating a first set of energy management policies associated with a predefined area within a gateway located in the predefined area and a second set of energy management policies associated with a microgrid within an edge gateway located in the microgrid, wherein the microgrid provides power to the predefined areas. The method further includes measuring parameters of each predefined area such as phase, frequency and voltage associated with each of a plurality of inverters within the microgrid. The method includes measuring power usage data associated within predefined area and current charge level of batteries within the predefined area. The method further includes determining future power demand of the predefined area from the microgrid, based on predefined analytics performed on the past measured power usage data and the current charge level of the batteries and third party contextual data such as weather pattern. The method includes applying the first set of energy management policies within the predefined area based on the determined future power demand.

In another embodiment, a system for operating neighboring microgrids is disclosed. The system includes a processor and a memory communicatively coupled to the processor, wherein the memory stores processor instructions, which, on execution, causes the processor to create a first set of energy management policies associated with a predefined area within a gateway located in the predefined area and a second set of energy management policies associated with a microgrid within an edge gateway located in the microgrid, wherein the microgrid provides power to the predefined area. The processor instructions cause the processor to measure power usage data associated with predefined area and current charge level of batteries within the predefined area. The processor instructions further cause the processor to determine future power demand of the predefined area from the microgrid, based on predefined analytics performed on the measured power usage data and the current charge level of the batteries as well as on the contextual data that might come from third parties, such as weather data to predict future generation. The processor instructions cause the processor to apply the first set of energy management policies within the predefined area based on the determined future power demand.

In yet another embodiment, a non-transitory computer-readable storage medium is disclosed. The non-transitory computer-readable storage medium has instructions stored thereon, a set of computer-executable instructions causing a computer comprising one or more processors to perform steps comprising creating a first set of energy management policies associated with a predefined area within a gateway located in the predefined area and a second set of energy management policies associated with a microgrid within an edge gateway located in the microgrid, wherein the microgrid provides power to the predefined area; measuring power usage data associated with predefined area and current charge level of batteries within the predefined area; determining future power demand of the predefined area from the microgrid, based on predefined analytics performed on the measured phase, frequency, and voltage associated with each of the plurality of inverters and the measured power usage data and the current charge level of the batteries; and applying the first set of energy management policies within the predefined area based on the determined future power demand and second set of energy management policies.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Additional illustrative embodiments are listed below. In one embodiment, an exemplary microgrid environment 100 is illustrated in which various embodiments may be employed. The microgrid environment 100 includes a microgrid 102 that is connected to a utility grid 104 and facilities 106-1 to 106-n, collectively referred to as a plurality of facilities 106. The utility grid 104, for example, may be a substation that provides power to the microgrid 102. Based on the available power, and demand or requirement from the plurality of facilities 106, the microgrid 102 further distributes the power to one or more of the plurality of facilities 106. Examples of the plurality of facilities 106, may include but are not limited to a house, an office space, a commercial complex, or a hospital.

Figure 1:
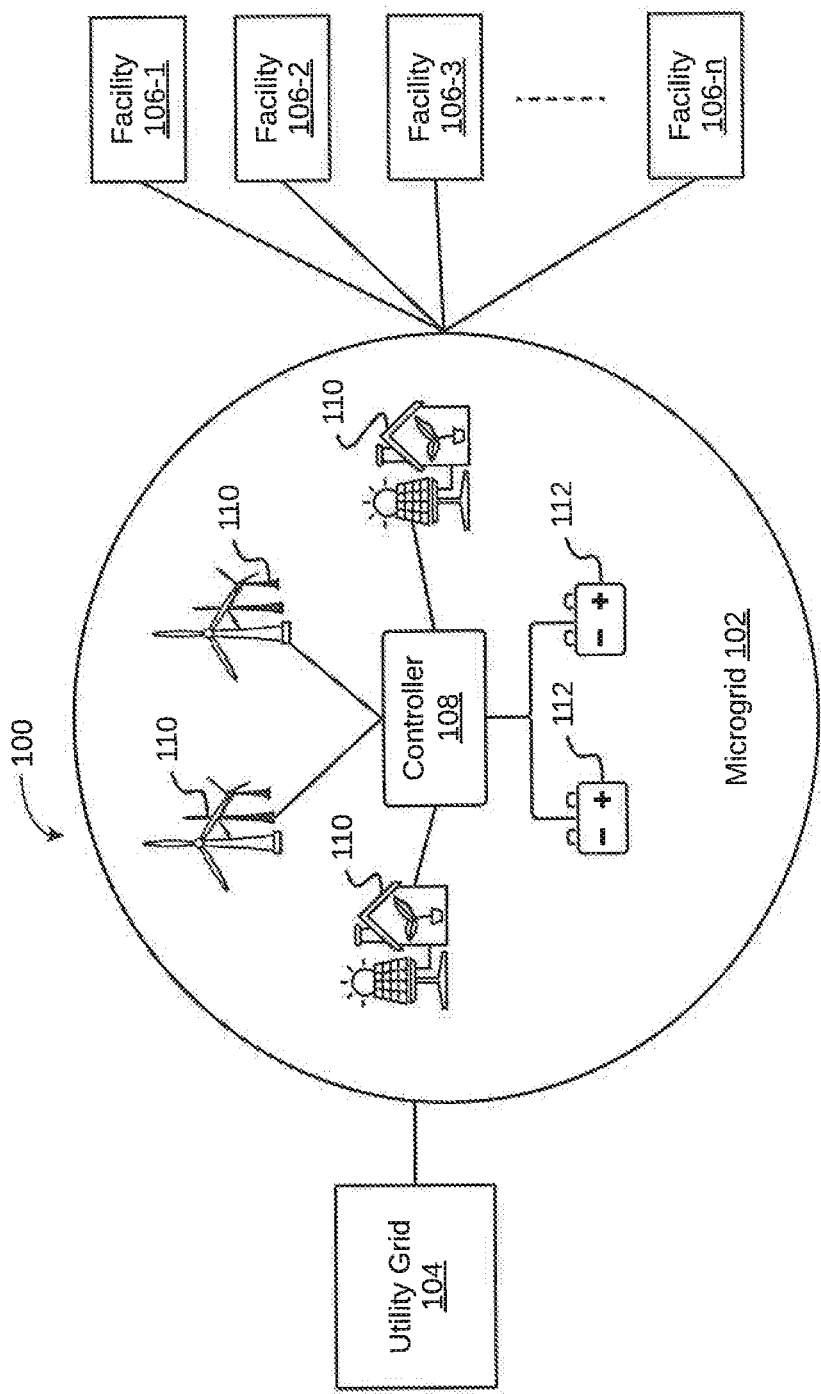
FIG. 1 illustrates an exemplary microgrid environment in which various embodiments may be employed.

The microgrid 102 includes a controller 108 that is coupled to a plurality of renewable energy sources 110 and a plurality of batteries 112. The plurality of renewable energy sources 110, for example, may include, but are not limited to solar panels or wind turbine (as depicted in FIG. 1). The plurality of renewable energy sources 110 may further include microturbines. The controller 108 controls charging or discharging of one or more of the plurality of batteries 112 and distribution of power to one or more of the plurality of facilities 106. Additionally, the controller 108 receives energy from the plurality of renewable energy sources 110 and stores the same in one or more of the plurality of batteries 112. The plurality of renewable energy sources 110 and the plurality of batteries 112 may collectively be referred to as Distributed Energy Resources (DER).

Figure 2:
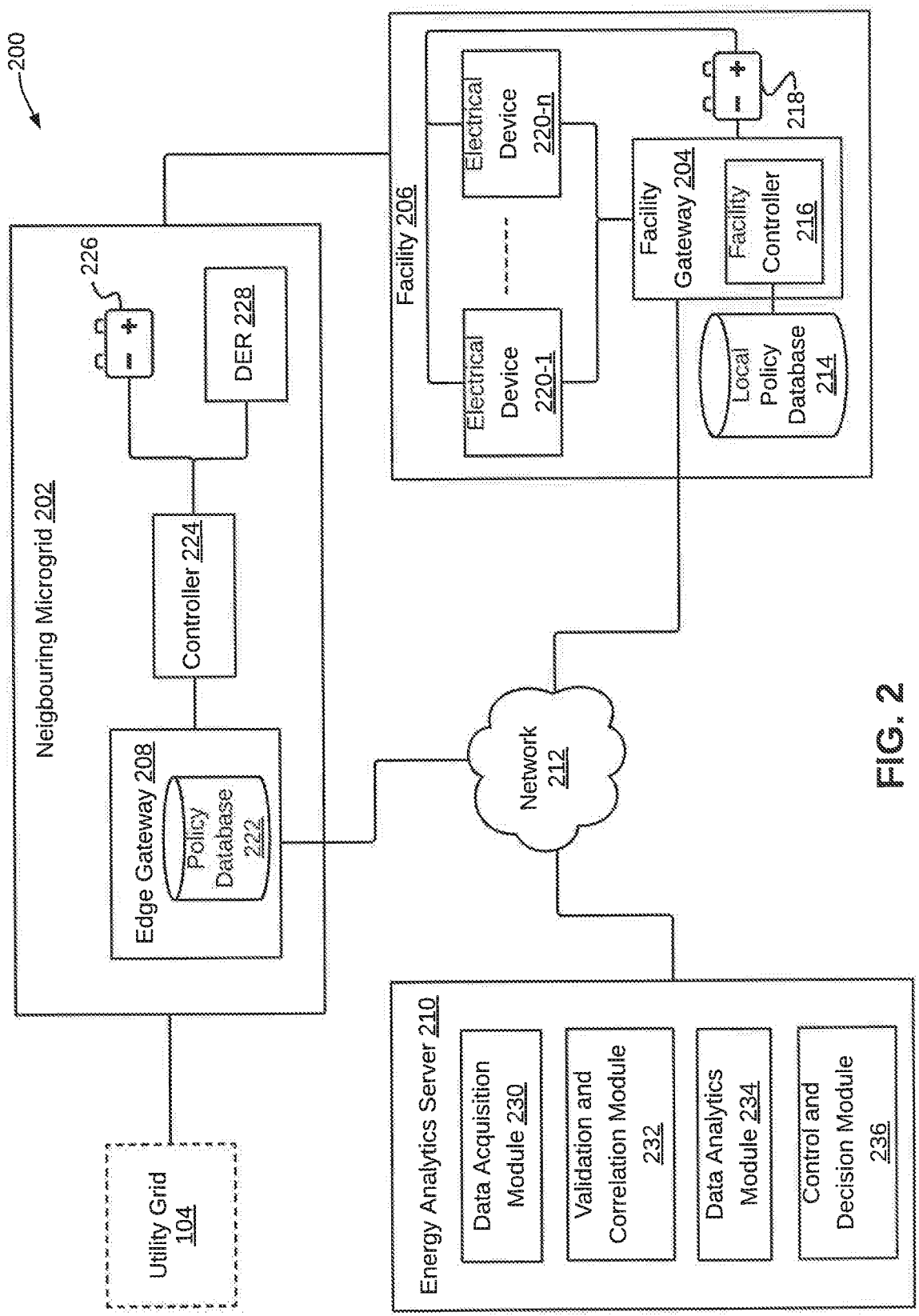
FIG. 2 is a block diagram illustrating various modules of a system for operating a neighboring microgrid distributed across a microgrid environment, in accordance with an embodiment.

Referring now to FIG. 2, a block diagram of various modules of a system 200 for operating a neighboring microgrid 202, which is distributed across a microgrid environment (for example, the microgrid environment 100) is illustrated, in accordance with an embodiment. The system 200 includes a facility gateway 204 within a facility 206 (which is a predefined area), an edge gateway 208 within the neighboring microgrid 202, and an energy analytics server 210, which are connected via a network 212. The network 212 may be a wired or a wireless network and the examples may include, but are not limited to the Internet, Long Term Evolution (LTE) network, Worldwide Interoperability for Microwave Access (WiMAX), or other enhanced wireless networking standards, for example, 5g or various variations of wired Ethernet such as industrial, time-sensitive networking.

The facility 206 may be a home and the facility gateway 204 may be an Internet gateway or a home gateway. The facility gateway 204 may include a facility controller 216 that implements a first set of energy management policies stored in a local policy database 214 in the facility 206. The facility controller 216, for example, may be a home energy management system. The facility controller 216 is also communicatively coupled to a battery 218 and electrical devices 220-1 to 220-n (collectively referred to as a plurality of electrical devices 220), via, the facility gateway 204. The first set of energy management policies are associated with a predefined area, i.e., the facility 206. In other words, the first set of energy management policies are specific to the facility 206. Based on the first set of energy management policies, the facility controller 216 may control operation of one or more of the plurality of electrical devices 220 and charging or discharging of the battery 218. It will be apparent to a person skilled in the art that the facility 206 may include multiple batteries. Thus, first set of energy management policies are used by the facility controller 216 for overall optimization and reduction of peak demands from the facility 206 to the neighboring microgrid 202 while taking into account local facility policies and microgrid policies.

The first set of energy management policies may be defined by an owner of the facility 206 or by an administrator, which may later be modified by the owner of the facility 206. The first set of energy management policies may be set through a mobile (for example, a mobile phone) or a web interface that is accessible through an energy analytics platform or a platform for home energy management system. Examples of the first set of energy management policies may include, but are not limited to switching off the Heating Ventilation and Air Conditioning (HVAC) unit only for a predefined time period, controlling operation of the HVAC unit based on outside temperature, prioritizing operation of medical devices, de-prioritizing operation of electrical devices requiring heavy load, or discharging the battery 218 during heavy loads and charging during low load to optimize power demands from the neighboring microgrid 202 for minimal fluctuation or to withdraw power when power is cheaper. In an embodiment, the facility controller 216 also executes a machine learning algorithm to estimate future energy usage pattern within the facility 206. To this end, each of the plurality of electrical devices 220 may be integrated with sensors that communicate with the facility controller 216 and provide operational data to the facility controller 216. In other words, each of the plurality of electrical devices 220 may be an Internet of Things (IoT) device. The machine learning algorithm may then be executed on the operation data thus received to estimate the future energy usage pattern.

The facility controller 216 in the facility gateway 204 additionally communicates with the edge gateway 208 in the neighboring microgrid 202, via the network 212. The facility controller 216 provides historic energy usage pattern and future energy usage pattern of the facility 206 to the edge gateway 208, Additionally, the edge gateway 208 shares information regarding the power received from the utility grid 104 with the facility controller 216. The edge gateway 208 is coupled to a controller 224 in the neighboring microgrid 202. The edge gateway 208 receives information regarding status (current charge) of a shared battery 226 coupled with the controller 224 as well as aggregated power generation from Distributed Energy Resources (DER) 228 within the neighboring microgrid 202, and power demand from facilities other than the facility 206, or current price or cost of the electricity and available options. To this end, data translation amongst data modes associated with the facility 206 and the neighboring microgrid 202 is enabled, as each of the facility gateway 204 and the edge gateway 208 may use different data models. The data translation is enabled through a networking infrastructure or other possible communication mechanisms, via the network 212. The data model used at the edge gateway 208 in the neighboring microgrid 202, for example, may include Open Field Message Bus (FMB) and the data model used by the facility gateway 204 in the facility 206 may include, but is not limited to OneM2M.

Like the facility gateway 204, the edge gateway 208 includes a policy database 222 that includes a second set of energy management policies associated with the neighboring microgrid 202. The second set of energy management policies defines distribution pattern for the power withdrawn from the utility grid 104. The distribution pattern corresponds to one or more of the plurality of facilities 106 (as shown in FIG. 1), which includes the facility 206. The distribution pattern for the facility 206 may be based on the energy requirement of the facility 206 and the associated priority. By way of an example, if the facility 206 is a hospital, the priority associated with the energy requirement of the facility 206 would be very high. The second set of energy management policies may also be based on the first set of energy management policies created for each of the plurality of facilities 106. Thus, the first set of management policies may be synched with the second set of energy management policies. The synching is enabled because of data translation amongst data models associated with the facility 206 and the neighboring microgrid 202.

The edge gateway 208 may further share data regarding energy usage pattern of the neighboring microgrid 202 and the facility gateway 204 may share data regarding energy usage pattern of the facility 206 with the energy analytics server 210, which may be a cloud based system. Various modules within the energy analytics server 210 run long-term analytics to provide visualization regarding status of the power usage to utility operators, operators of the neighboring microgrid 202, and owner of the facility 206. The visualization may be provided through an application installed on respective devices.

The energy analytics server 210 further includes a data acquisition module 230, a validation and correlation module 232, a data analytics module 234, and a control and decision module 236. The data acquisition module 230 receives data from each of the edge gateway 208 and the facility gateway 204 and converts the data into a standard format that may be used by the energy analytics server 210. The data acquisition module 230 may also receive data from a weather bureau (not shown in FIG. 2) regarding weather forecast, which may be used by the energy analytics server 210. Thereafter, the validation and correlation module 232 validates the data converted into the standard format and correlates the data received from the edge gateway 208, the facility gateway 204, and the weather bureau. After the data has been validated and correlated, the data analytics module 234 performs analytics on the data. The data analytics module 234 may execute a machine learning model on the data, which may have been trained earlier. In an embodiment, trained machine learning model may be shared with the edge gateway 208, such that, an edge algorithm within the edge gateway 208 may be designed to take advantage of this model and implement local fast data analytics and edge control within the neighboring microgrid 202.

The result of analytics performed on the data is then used by the control and decision module 236 to determine optimal power distribution amongst the plurality of facilities 106 by the neighboring microgrid 202 and to determine optimal operation of the neighboring microgrid 202. The control and decision module 236 may also decide to adjust instantaneous power pricing to control demand and determine need to bring back-up generators in-line.

In the system 200, the first set of energy management policies may be as flexible and tuned to the environment as desired and may be set from maximum comfort to minimum withdraw from the neighboring microgrid 202 and the utility grid 104. These policies may be managed, through a unified dashboard that supports different levels of access privileges. For example, an owner of the facility 206 may only have control over the first set of energy management policies and the operator of the neighboring microgrid 202 may only have control over the second set of energy management policies, i.e., global policies. As discussed earlier, the system 200 may also be connected with third party data, and hence the first and the second set of energy management policies may be made adaptive to external factors, for example, energy pricing or weather, thereby allowing optimal efficiency and flexible business models. The system 200 thus tries to balance power generation and demand locally.

Figure 3:
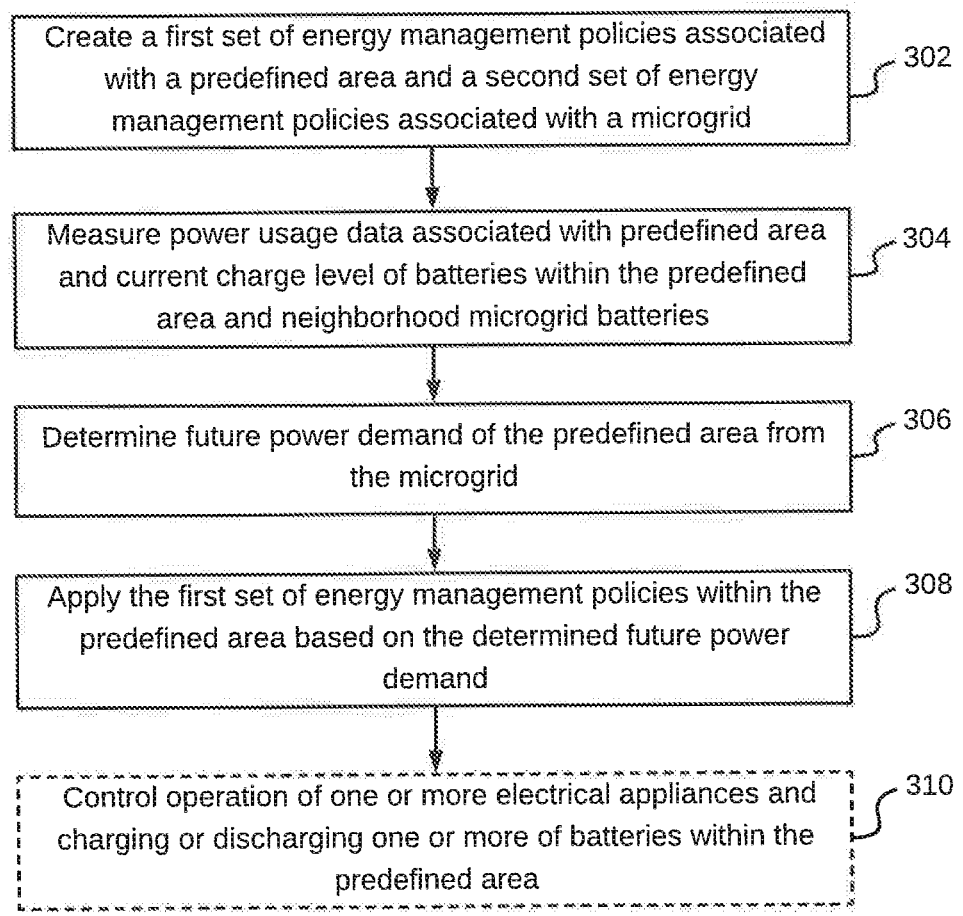
FIG. 3 illustrates a flowchart of a method for operating a neighboring microgrid, in accordance with an embodiment.

Referring now to FIG. 3, a flowchart of a method for operating the neighboring microgrid 202 is illustrated, in accordance with an embodiment. At step 302, a first set of energy management policies associated with a predefined area (for example, the facility 206) is created within a gateway (for example, the facility gateway 204) located in the predefined area. Additionally, at step 302, a second set of energy management policies associated with a microgrid (for example, the neighboring microgrid 202) is created within an edge gateway (for example, the edge gateway 208) located in the microgrid. The microgrid provides power to the predefined area. The first set of energy management policies are associated with operation of electrical appliances and discharging or charging of batteries within the predefined area. The first and second set of energy management policies have already been explained in detail in conjunction with FIG. 2.

Inverters connected to various Direct Current (DC) generation sources (for example, the shared battery 226 or the DER 228) within the microgrid may share signal information, such as, frequency, phase, and voltage levels so that they all can stay synchronized. By way of an example, synchronized networking among rooftop solar inverters and shared battery ensure synchronization of various inverters to enable information exchange across electric boundaries for near real-time load control and system optimization.

At step 304, power usage data associated with predefined area and current charge level of batteries within the predefined area are measured. The measurement may, for example, be performed by the facility controller 216. Additionally, at step 304, current charge level of one or more batteries in the neighborhood microgrid 202 is also measured. Thereafter, at step 306, based on predefined analytics performed on the measured power usage data and the current charge level of one or more batteries in the neighborhood microgrid 202, future power demand of the predefined area from the neighboring microgrid 202 is determined. The predefined analytics, for example, may be performed by one or more of the facility controller 216, the edge gateway 208, or the energy analytics server 210.

Based on the determined future power demand of the predefined area, at step 308 the first set of energy management policies are applied within the predefined area. Based on the first set of energy management policies applied within the predefined area, at step 310, operation of one or more of the electrical devices and charging or discharging one or more of the batteries within the predefined area are controlled. In other words, the first set of energy management policies are applied to optimize criteria such as minimum cost, minimum withdraw from the neighboring microgrid or neighborhood battery, or maximum comfort. Based upon the criteria, a calculated control pattern is applied to electrical devices within the predefined area. By way of an example, a decision on whether to charge or withdraw power from the battery within the predefined area may be made. By way of another example, a decision on which electrical devices should stay on and which one should be turned off to optimize selected criteria, may be made. The electrical device turn on-off criteria is based on optimization of cost and minimum overall cost during a particular month for the same total power consumption along with the constraints that critical electrical devices should stay on, when desired.

In an embodiment, data sharing amongst the plurality of facilities 106 connected to the neighboring microgrid may also be performed. As a result, the overall peak demand of the neighboring microgrid may be reduced by taking turns in operation of flexible loads, such as, charging of car batteries.

Figure 4:
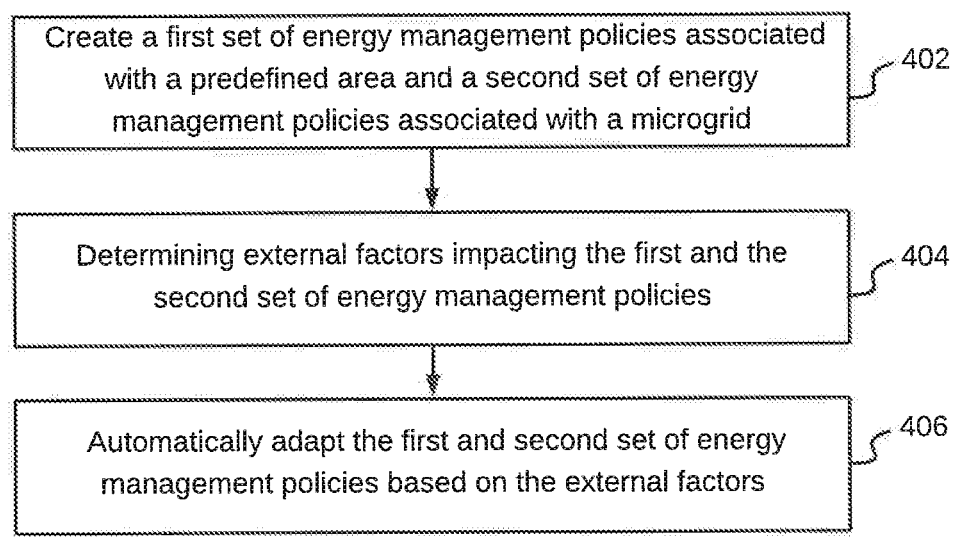
FIG. 4 illustrates a flowchart of a method for adapting energy management policies based on external factors, in accordance with an embodiment.

Referring now to FIG. 4, a flowchart of a method for adapting energy management policies based on external factors is illustrated, in accordance with an embodiment. At step 402, a first set of energy management policies associated with a predefined area and a second set of energy management policies associated with a microgrid are created. At step 404, external factors that may impact one or more of the first and the second set of energy management policies may be determined. The external factors may include, but are not limited to weather and dynamic energy pricing. By way of an example, energy analytics server 210 may receive data from a weather bureau regarding weather forecast. At step 406, based on the external factors, the first set of energy management policies and the second set of energy management policies may be automatically adapted.

Figure 5:
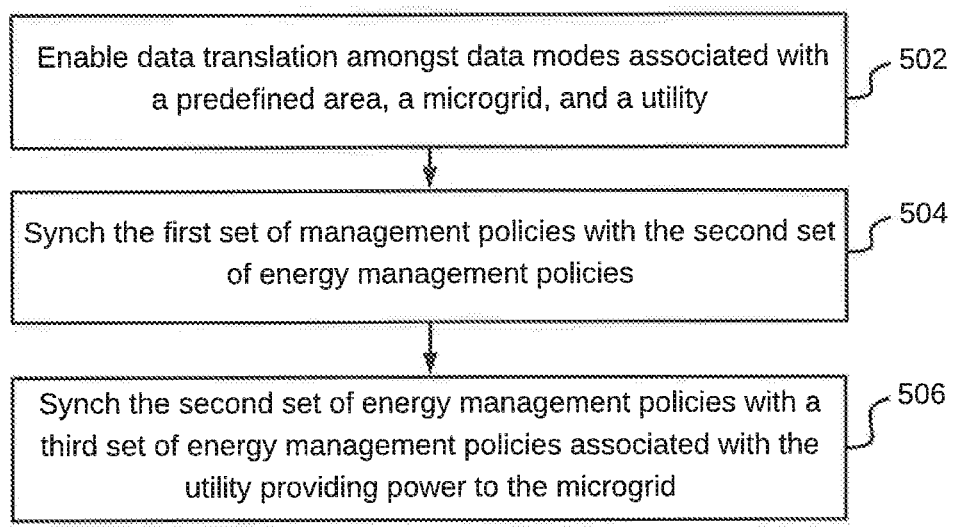
FIG. 5 illustrates a flowchart of a method for synching energy management policies across a facility, a microgrid, and a utility, in accordance with an embodiment.

Referring to FIG. 5, a flowchart of a method for synching energy management policies across a facility, a microgrid, and a utility is illustrated, in accordance with an embodiment. At step 502, data translation amongst data modes associated with a predefined area, a microgrid, and a utility is enabled. The data translation has been explained in detail in conjunction with FIG. 2. At step 504, the first set of management policies is synched with the second set of energy management policies. At step 506, the second set of energy management policies with a third set of energy management policies associated with the utility that provides power to the microgrid. This has been explained in detail in conjunction with FIG. 2.

Figure 6:
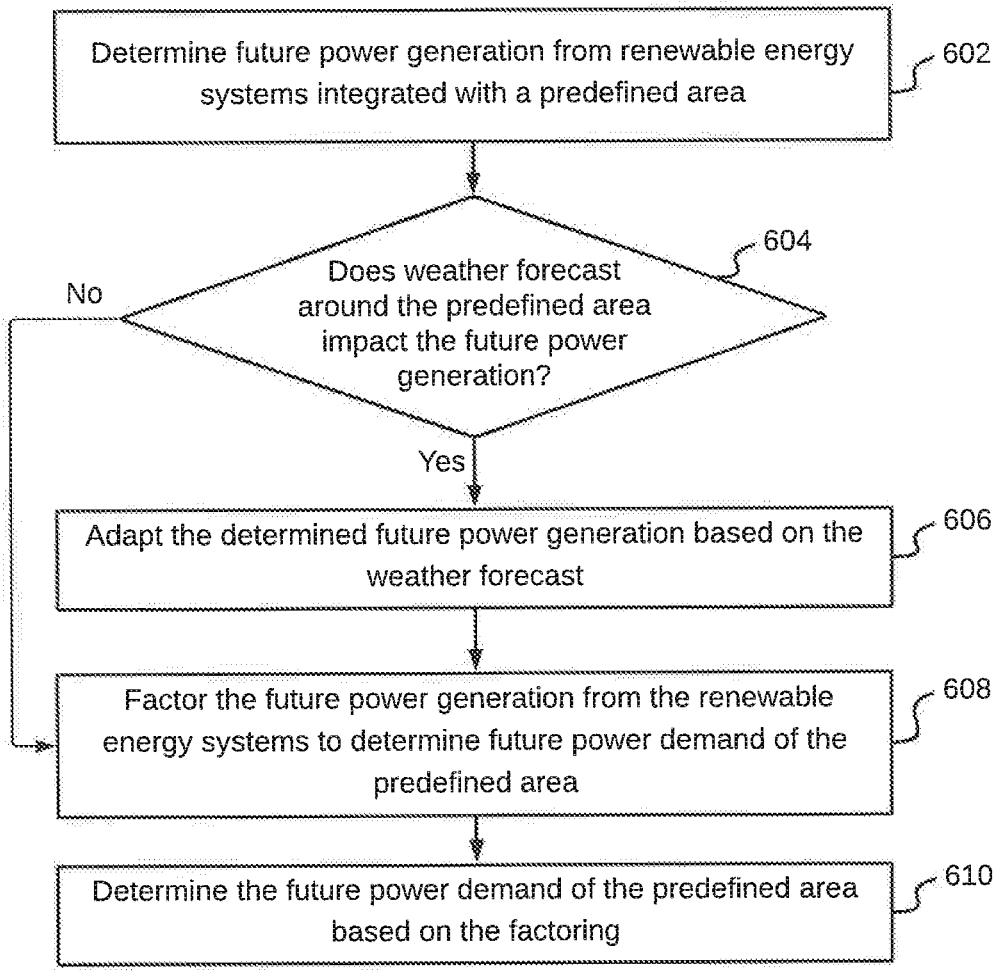
FIG. 6 illustrates a flowchart of a method for determining future power demand of a facility from a microgrid based on future power generation from renewable energy systems, in accordance with an embodiment.

Referring now to FIG. 6, a flowchart of a method for determining future power demand of a facility from a microgrid based on future power generation from renewable energy systems is illustrated, in accordance with an embodiment. At step 602, future power generation from renewable energy systems integrated with a predefined area, (for example, the facility 206) is determined. The renewable energy systems may be directly integrated with the microgrid as well. As explained before, inverters connected to various Direct Current (DC) generation sources (for example, the renewable energy systems) may share signal information, such as, frequency, phase, and voltage levels so that they all can stay synchronized. Further, power generation and demand is also continuously measured. Based on this information, future power generation from renewable energy systems may be determined, for example, by the facility controller 216 or the energy analytics server 210.

At step 604, a check is performed to determine whether the weather forecast around the predefined area impacts the future power generation from the renewable energy systems. By way of an example, if the weather forecast predicts a rainy day, the power generation from a rooftop solar panel may be minimal or zero. On the contrary, if the temperature is predicted to be very high along with a sunny day, the power generation from the rooftop solar panel may be very high. If the weather forecast impacts the future power generation, at step 606, the determined future power generation is adapted based on the weather forecast. Thereafter, at step 608, the future power generation from the renewable energy systems post adaptation is factored to determine future power demand of the predefined area. At step 610, the future power demand of the predefined area is determined based on the factoring.

Referring back to step 604, when the weather forecast does not impact the future power generation, at step 608, the future power generation from the renewable energy systems is factored to determine future power demand of the predefined area. At step 610, the future power demand of the predefined area is determined based on the factoring. Thus, in this case, the future power generation is not adapted based on the weather forecast.

Figure 7:
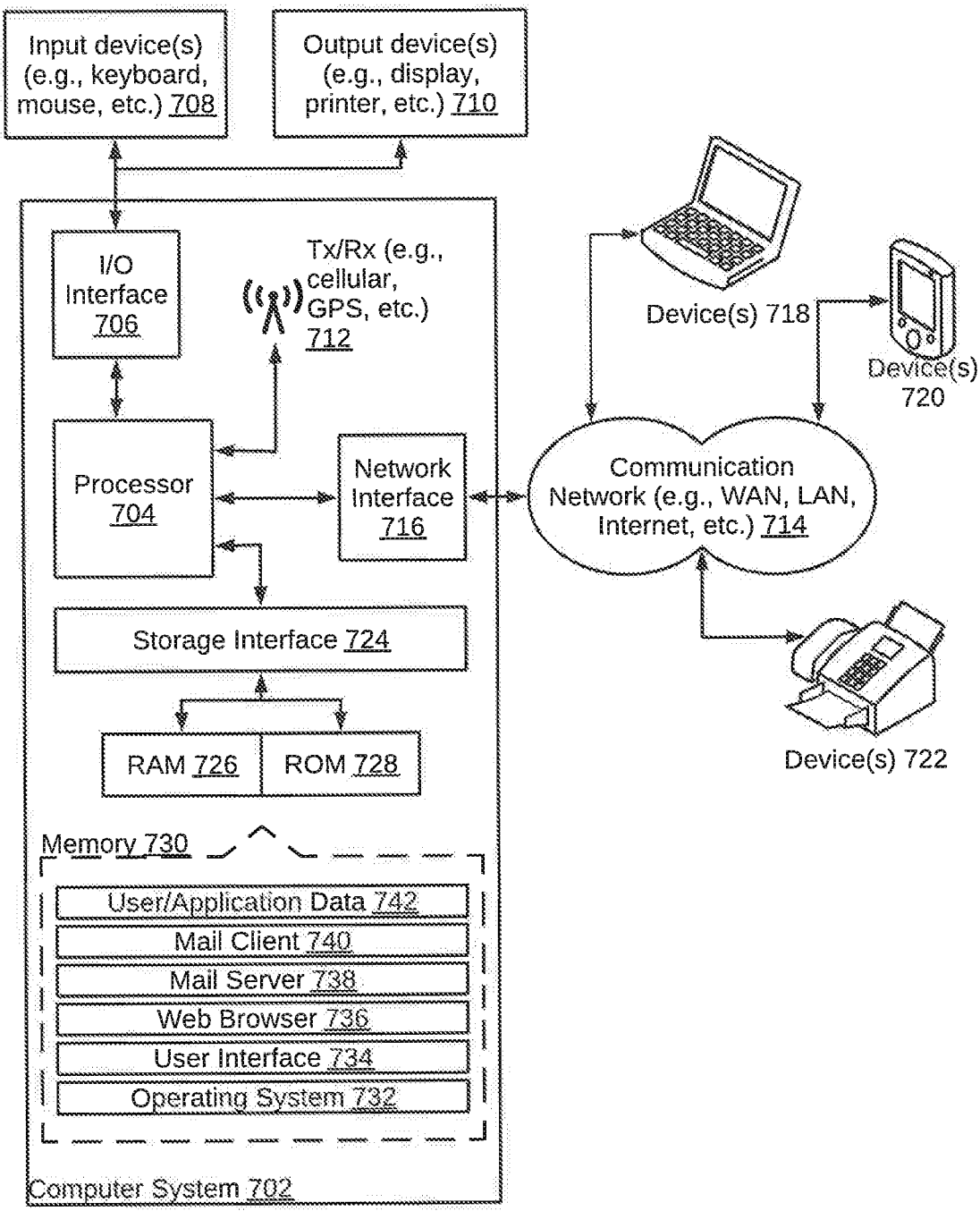
FIG. 7 illustrates a block diagram of an exemplary computer system for implementing various embodiments.

FIG. 7 is a block diagram of an exemplary computer system 702 for implementing various embodiments. Computer system 702 may include a central processing unit ("CPU" or "processor") 704, Processor 704 may include at least one data processor for executing program components for executing user- or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (e.g., RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (e.g., any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as Internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide methods and systems for operating neighboring microgrids. The system provides a microgrid architecture that supports flexible deployment and business models and can integrate with home energy systems. This ensures that utilities can adapt deployment and further evolve it so that they can have a positive business case in an ever-evolving market.

The proposed method and system is widely applicable in various contexts, from microgrids in an urban environment to microgrids in rural areas to campus-wide microgrids in universities and corporate offices. Since the design affords use of distributed generation and affords synchronization among them, it can even be used in developing world and disaster area to create a working system without the need of connectivity with main grid to support local energy sustainability.

The system provides a small area microgrid system that allows load-sharing and balancing within the smaller area, thereby drawing less peak power from the main grid and increasing overall microgrid stability. The network provided in the system may also integrated with smart meter and home networking and energy management system to allow end-to-end control. The distributed design of the system allows individual users to set their own home/office policies while allowing the neighboring microgrid authority to set overall microgrid policies. Moreover, the system allows for visualization and control of individual homes, individual microgrids as well as for distribution operator of the area for visualization and policy setting of micro-grids in the operator area.

The specification has described methods and systems for operating neighboring microgrids. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for operating neighboring microgrids, the method comprising:
    creating a first set of energy management policies associated with a predefined area within a gateway located in the predefined area and a second set of energy management policies associated with a microgrid within an edge gateway located in the microgrid, wherein the microgrid provides power to the predefined area;
    synching the first set of energy management policies associated with the predefined area with the second set of energy management policies associated with the microgrid and the second set of energy management policies with a third set of energy management policies associated with a utility providing power to the microgrid;
    measuring power usage data associated with the predefined area and current charge level of batteries within the predefined area, and current charge level of one or more batteries in the microgrid;
    determining future power demand of the predefined area from the microgrid, based on pre-trained analytics performed on the measured power usage data and the current charge level of the batteries within the predefined area and the current charge level of one or more batteries in the microgrid; and
    applying the first set of energy management policies to control operation of electrical appliances within the predefined area based on the determined future power demand.

2. The method of claim 1, wherein the first set of energy management policies are associated with the operation of the electrical appliances and discharging or charging of batteries within the predefined area.

3. The method of claim 2 further comprising controlling the operation of one or more of the electrical appliances and charging or discharging one or more of the batteries, based on the first set of energy management policies applied within the predefined area.

4. The method of claim 1 further comprising automatically adapting the first set of energy management policies and the second set of energy management policies based on external factors, wherein the external factors comprise at least one of weather and dynamic energy pricing.

5. The method of claim 1, wherein synching the first, second, and third set of energy management policies comprises enabling data translation amongst data models associated with the predefined area, the microgrid, and the utility.

6. The method of claim 1 further comprising:
determining future power generation from renewable energy systems integrated with the predefined area; and
adapting the determined future power generation based on weather forecast around the predefined area.

7. The method of claim 6, wherein determining future power demand of the predefined area from the microgrid comprises factoring the adapted future power generation from the renewable energy systems.

8. A system for operating neighboring microgrids, the system comprising:
a processor; and
a memory communicatively coupled to the processor, wherein the memory stores processor instructions, which, on execution, causes the processor to:
create a first set of energy management policies associated with a predefined area within a gateway located in the predefined area and a second set of energy management policies associated with a microgrid within an edge gateway located in the microgrid, wherein the microgrid provides power to the predefined area;
synch the first set of energy management policies associated with the predefined area with the second set of energy management policies associated with the microgrid and the second set of energy management policies with a third set of energy management policies associated with a utility providing power to the microgrid;
measure power usage data associated with the predefined area and current charge level of batteries within the predefined area, and current charge level of one or more batteries in the microgrid;
determine future power demand of the predefined area from the microgrid, based on a pre-trained analytics performed on the measured power usage data and the current charge level of the batteries within the predefined area and the current charge level of one or more batteries in the microgrid; and
apply the first set of energy management policies to control operation of electrical appliances within the predefined area based on the determined future power demand.

9. The system of claim 8, wherein the first set of energy management policies are associated with the operation of the electrical appliances and discharging or charging of batteries within the predefined area.

10. The system of claim 9, wherein the processor instructions further cause the processor to control the operation of one or more of the electrical appliances and charging or discharging one or more of the batteries, based on the first set of energy management policies applied within the predefined area.

11. The system of claim 8, wherein the processor instructions further cause the processor to automatically adapt the first set of energy management policies and the second set of energy management policies based on external factors, wherein the external factors comprise at least one of weather and dynamic energy pricing.

12. The system of claim 8, wherein to synch the first, second, and third set of energy management policies the processor instructions cause the processor to enable data translation amongst data models associated with the predefined area, the microgrid, and the utility.

13. The system of claim 8, wherein the processor instructions further cause the processor to:
determine future power generation from renewable energy systems integrated with the predefined area; and
adapt the determined future power generation based on weather forecast around the predefined area.

14. The system of claim 13, wherein to determine future power demand of the predefined area from the microgrid, the processor instructions further cause the processor to factor the adapted future power generation from the renewable energy systems.

15. A non-transitory computer-readable storage medium having stored thereon, a set of computer-executable instructions causing a computer comprising one or more processors to perform steps comprising:
creating a first set of energy management policies associated with a predefined area within a gateway located in the predefined area and a second set of energy management policies associated with a microgrid within an edge gateway located in the microgrid, wherein the microgrid provides power to the predefined area;
synching the first set of energy management policies associated with the predefined area with the second set of energy management policies associated with the microgrid and the second set of energy management policies with a third set of energy management policies associated with a utility providing power to the microgrid;
measuring power usage data associated with predefined area and current charge level of batteries within the predefined area, and current charge level of one or more batteries in the microgrid;
determining future power demand of the predefined area from the microgrid, based on pre-trained analytics performed on the measured power usage data and the current charge level of the batteries within the predefined area and the current charge level of one or more batteries in the microgrid; and
applying the first set of energy management policies to control operation of electrical appliances within the predefined area based on the determined future power demand.

16. The non-transitory computer-readable storage medium of claim 15, wherein the first set of energy management policies are associated with the operation of the electrical appliances and discharging or charging of batteries within the predefined area.

* * * * *